(12) United States Patent
Liu

(10) Patent No.: US 11,422,400 B2
(45) Date of Patent: Aug. 23, 2022

(54) DISPLAY PANEL AND DISPLAY DEVICE

(71) Applicants: HKC CORPORATION LIMITED, Shenzhen (CN); CHONGQING HKC OPTOELECTRONICS TECHNOLOGY CO., LTD., Chongqing (CN)

(72) Inventor: Zhongnian Liu, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 801 days.

(21) Appl. No.: 16/319,470

(22) PCT Filed: Oct. 31, 2018

(86) PCT No.: PCT/CN2018/112851
§ 371 (c)(1),
(2) Date: Jan. 21, 2019

(87) PCT Pub. No.: WO2019/223242
PCT Pub. Date: Nov. 28, 2019

(65) Prior Publication Data
US 2021/0356804 A1    Nov. 18, 2021

(30) Foreign Application Priority Data

May 21, 2018   (CN) .......................... 201810492122.5

(51) Int. Cl.
*G02F 1/1333*   (2006.01)
*G02F 1/1335*   (2006.01)
(Continued)

(52) U.S. Cl.
CPC ...... *G02F 1/133388* (2021.01); *G02F 1/1337* (2013.01); *G02F 1/1368* (2013.01);
(Continued)

(58) Field of Classification Search
CPC ............ G02F 1/1368; G02F 1/133345; G02F 1/133512; G02F 1/1337; G02F 1/13394; G02F 1/133388
See application file for complete search history.

(56) References Cited

U.S. PATENT DOCUMENTS

2014/0160413 A1*  6/2014  Nishida ............ G02F 1/134309
                                              349/123
2015/0131025 A1*  5/2015  Ota ................... G02F 1/133512
                                              349/58
(Continued)

FOREIGN PATENT DOCUMENTS

CN   101604085 A   12/2009
CN   101753861 A    6/2010
(Continued)

OTHER PUBLICATIONS

International Search Repon issued in corresponding International application No. PCT/CN2018/112851, dated Jan. 30, 2019 (6 pages).
(Continued)

*Primary Examiner* — Mariam Qureshi

(57) ABSTRACT

This application discloses a display panel and a display device. The display panel includes: a first substrate, provided with a plurality of recessed portions; a second substrate, including a first metal layer; a plurality of photo spacers; a peripheral area; and a second metal layer. The depth of the recessed portion is smaller than a doubled thickness of the second metal layer.

20 Claims, 4 Drawing Sheets

(51) Int. Cl.
*G02F 1/1337* (2006.01)
*G02F 1/1339* (2006.01)
*G02F 1/1343* (2006.01)
*G02F 1/1368* (2006.01)

(52) U.S. Cl.
CPC .... *G02F 1/13394* (2013.01); *G02F 1/133302* (2021.01); *G02F 1/133345* (2013.01); *G02F 1/133512* (2013.01); *G02F 1/134309* (2013.01)

(56) References Cited

U.S. PATENT DOCUMENTS

| | | | | |
|---|---|---|---|---|
| 2015/0131041 | A1* | 5/2015 | Moriwaki | G02F 1/133345 349/106 |
| 2018/0031890 | A1 | 2/2018 | Jung et al. | |
| 2019/0162993 | A1* | 5/2019 | Hong | G02F 1/133602 |

FOREIGN PATENT DOCUMENTS

| | | |
|---|---|---|
| CN | 102375264 A | 3/2012 |
| CN | 104299973 A | 1/2015 |
| CN | 105720176 A | 6/2016 |
| CN | 106125412 A | 11/2016 |
| CN | 106653773 A | 5/2017 |
| CN | 106940495 A | 7/2017 |
| CN | 107402478 A | 11/2017 |
| CN | 108710242 A | 10/2018 |
| WO | 2017054887 A1 | 4/2017 |

OTHER PUBLICATIONS

Written opinion of the International Search Authority in coresponding International application No. PCT/CN2018/11285.
First Office Action from China patent office in a counterpart Chinese patent Application 201810115561.4, dated Mar. 19, 2020 (9 pages).

* cited by examiner

DISPLAY PANEL AND DISPLAY DEVICE

This application claims priority to Chinese Patent Application No. CN201810492122.5, filed with the Chinese Patent Office on May 21, 2018 and entitled "DISPLAY PANEL AND DISPLAY DEVICE", which is incorporated herein by reference in its entirety.

TECHNICAL FIELD

This application relates to the field of display technologies, and in particular, to a display panel and a display device.

BACKGROUND

Descriptions herein merely provide background information related to this application, and do not necessarily constitute the prior art.

Displays usually are controlled by using an active switch, have various advantages such as thin body, power saving, and no radiation, and are widely applied. The display mainly includes an organic light-emitting diode (OLED) display, a liquid crystal display, a quantum dot light emitting diode (QLED) display, a plasma display, and the like. Seen from external structures, the displays are classified into flat panel display and curved display. The liquid crystal display includes two parts of a liquid crystal panel and a backlight module, and a working principle of the liquid crystal display is placing liquid crystal molecules between two parallel glass substrates, and applying a drive voltage on the two glass substrates to control rotation directions of the liquid crystal molecules, to refract light rays of the backlight module to generate images. The OLED display performs displaying through self-illumination of an LED, and has advantages such as self-luminescent, wide viewing angle, nearly infinite high contrast, relatively low power consumption, and extremely high reaction speed. A structure of the QLED display is similar to the OLED technology, and a main difference is that a light emitting center of the QLED is composed of quantum dot materials. The structure of the QLED display is forming quantum photons after electrons and electron holes at two sides are converged at a quantum dot layer, and emitting light by recombining the quantum photons.

During a process of manufacturing a thin film transistor-liquid crystal display (TFT-LCD) panel, design and control of a cell thickness is one of the key technologies of the liquid crystal display, and directly affects the quality of the display. The thickness of a liquid crystal layer is mainly controlled by photo spacers (PS) between a color film substrate and an array substrate. Because the heights of the PSs are all equal on the entire display panel, uniformity of the thickness of a liquid crystal cell of the display panel may easily change, affecting a display effect of the display panel.

SUMMARY

This application provides a display panel that improves uniformity of the thickness of a liquid crystal cell.

To achieve the foregoing objective, this application provides a display panel, comprising:

a first substrate, provided with a plurality of recessed portions;

a second substrate, comprising a first metal layer;

a color photoresist layer, formed on the first substrate or the second substrate;

a liquid crystal layer, formed between the first substrate and the second substrate;

a plurality of photo spacers, arranged between the first substrate and the second substrate;

a display area, the color photoresist layer and the liquid crystal layer being arranged in the display area; and a peripheral area, the recessed portions being arranged in the peripheral area, wherein one end of the photo spacer in the display area is arranged on the first substrate, and the other end is arranged on the first metal layer; a second metal layer is arranged on the second substrate in the peripheral area; the second metal layer is arranged on the first metal layer; one end of the photo spacer in the peripheral area is arranged on the recessed portion; the other end of the photo spacer in the peripheral area is arranged on the second metal layer; and the depth of the recessed portion is smaller than a doubled thickness of the second metal layer.

Optionally, the depth of the recessed portion is equal to the thickness of the second metal layer. In this way, the depth of the recessed portion is set to be equal to the thickness of the second metal layer, so that steps of butting positions at a first substrate side and a second substrate side are the same. To be specific, in the display area, the height of the photo spacer on the first substrate and the film thickness of the second substrate at an opposite side are the first metal layer. However, in the peripheral area, the first substrate is a value obtained by subscribing the depth of the recessed portion from the height of the photo spacer, and the film thickness of the second substrate at the opposite side is a value obtained by adding the thickness of the first metal layer and that of the second metal layer. Therefore, steps from the first substrate in the display area and the peripheral area to the second substrate are completely equal. Thus, uniformity of the thickness of the liquid crystal cell of the display panel is consistent, thereby effectively ensuring the color and the brightness of the display panel to be more even, and improving a display effect of the display panel. In this way, competitiveness of the product is further improved.

Optionally, the first substrate comprises a black matrix layer, and the recessed portion is arranged on the black matrix layer. In this way, the thickness that is of the black matrix layer and that is at a proper position at which the photo spacer needs to be arranged is controlled through a multi-tone photomask process, so that the thicknesses of the liquid crystal cell in the display area and the peripheral area are substantially consistent. Therefore, the color and the brightness of the display panel are more even, thereby effectively ensuring a better display effect of the display panel.

Optionally, the first substrate comprises a transparent electrode layer, and the recessed portion is arranged on the transparent electrode layer. In this way, the thickness that is of the transparent electrode layer and that is at a proper position at which the photo spacer needs to be arranged is controlled through the multi-tone photomask process, so that the thicknesses of the liquid crystal cell in the display area and the peripheral area are substantially consistent. As a result, a phenomenon of uneven brightness of the display panel is effectively improved. Therefore, the display effect of the display panel is better, and a display quality of the display panel is improved.

Optionally, the first substrate comprises a first motherboard, and the recessed portion is arranged on the first motherboard. In this way, the recessed portion is formed on the first motherboard, and then a subsequent manufacture procedure is performed on the first motherboard merely through an exemplary process. The black matrix layer, the color photoresist layer, the transparent electrode layer, and the like that are arranged in the subsequent manufacture procedure are arranged at the recessed portions of the first motherboard based on the shapes of the recessed portions, without changing a process of the subsequent manufacture procedure, thereby effectively ensuring manufacturing efficiency of the display panel.

Optionally; the first substrate comprises an alignment film layer, and the recessed portion is arranged on the alignment film layer. In this way, the recessed portion is formed on the alignment film layer, and then a subsequent manufacture procedure is performed on the first motherboard merely through an exemplary process, without changing a process of the subsequent manufacture procedure, thereby effectively ensuring manufacturing efficiency of the display panel.

Optionally, the recessed portions are rectangular grooves arranged at intervals and/or strip-shaped grooves arranged in parallel. In this way, the rectangular groove and/or the strip-shaped groove may be arranged in the peripheral area based on the length and width of an end that is of the photo spacer and that is in contact with the first substrate, so as to effectively match the shape of each photo spacer, effectively limit the photo spacer, effectively avoid a displacement of the photo spacer, and ensure better work of liquid crystals in the liquid crystal cell. Therefore, the color and the brightness of the display panel are ensured to be more even, and a display effects of the display panel is improved.

Optionally, the second metal layer comprises a source layer and a drain layer, a channel is arranged between the source layer and the drain layer, and the photo spacer is arranged in a manner of crossing the channel. In this way, the photo spacer can form effective support at two ends of the channel, so that the photo spacer can be more stably arranged on the second metal layer, ensuring better work of liquid crystals in the liquid crystal cell. Therefore, the color and the brightness of the display panel are ensured to be more even, and a display effect of the display panel is improved, thereby further improving competitiveness of the product.

Optionally, a protective layer covers the second metal layer, and a support layer is arranged in an orthographic projection area that is of the photo spacer and that is on the protective layer. In this way, the photo spacer is better supported by arranging the support layer, thereby effectively relieving a deformation of the second metal layer caused by an external force on the photo spacer during the subsequent manufacture procedure, and well reducing impacts on an electrical property of the second metal layer. Therefore, a phenomenon that dark spots occur when a light is turned on is improved, so that a display effect of the display panel becomes better, and a display quality of the display panel is improved.

This application further provides a display device. The display device comprises a control component and the display panel of this application.

In this application, because the photo spacer in the peripheral area is arranged at a position corresponding to the recessed portion, the depth of the recessed portion is smaller than a doubled thickness of the second metal layer. Therefore, uniformity of the thickness of the liquid crystal cell of the display panel is effectively improved, so as to effectively improve a phenomenon of uneven brightness of the display panel. Therefore, the display effect of the display panel is better, and the display quality of the display panel is improved. Moreover, the arrangement of the recessed portion effectively limits the photo spacer, thereby effectively avoiding a displacement of the photo spacer, and ensuring better work of the liquid crystals in the liquid crystal cell. Therefore, the color and the brightness of the display panel are ensured to be more even, and the display effect of the display panel is improved, thereby further improving competitiveness of the product.

BRIEF DESCRIPTION OF DRAWINGS

The drawings included are used far providing understanding of embodiments of this application, constitute part of the specification, and are used for illustrating implementation manners of this application, and interpreting principles of this application together with text description. Apparently, the drawings in the following description are merely some embodiments of this application, and for those ordinary skilled in the art, other drawings can also be obtained according to the drawings without contributing creative labor. In the drawings.

DETAILED DESCRIPTION

Figure 1:
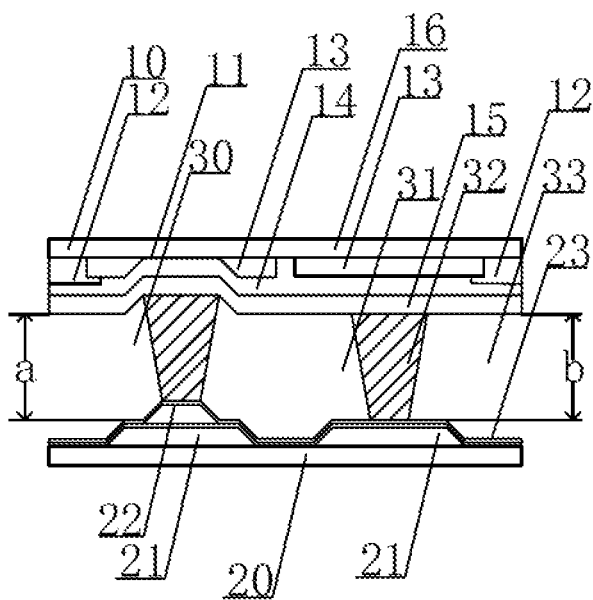
FIG. 1 is a schematic partial structural diagram of a display panel according to an embodiment of this application.

Specific structures and functional details disclosed herein are merely representative, and are intended to describe the objectives of the exemplary embodiments of this application. However, this application may be specifically implemented in many alternative forms, and should not be construed as being limited to the embodiments set forth herein.

In the description of this application, it should be understood that orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application. In addition, the terms such as "first" and "second" are used only for the purpose of description, and should not be understood as indicating or implying the relative importance or implicitly specifying the number of the indicated technical features. Therefore, a feature defined by "first" or "second" can explicitly or implicitly include one or more of said features. In the description of this application, unless otherwise stated, "a plurality of" means two or more than two. In addition, the tennis "include", "comprise" and any variant thereof are intended to cover non-exclusive inclusion.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in this application according to specific situations.

The terminology used herein is for the propose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, operations, elements, and/or components, but do not preclude the presence or addition of one or more other features, integers, steps, operations, elements, components, and/or combinations thereof.

In the figures, units with similar structures are represented by using the same reference number.

As shown in FIG. 1 to FIG. 7, a display panel and a display device in this application are further described in the embodiments.

A display panel is provided. The display panel includes:

a first substrate 10, provided with a plurality of recessed portions 11;

a second substrate 20, including a first metal layer 21;

a color pho layer 12, formed on the first substrate 10 or the second substrate 20;

a liquid crystal layer 33, formed between the first substrate 10 and the second substrate 20;

a plurality of photo spacers 32, arranged between the first substrate 10 and the second substrate 20;

a display area 30, the color photoresist layer 12 and the liquid crystal layer 33 being arranged in the display area 30; and a peripheral area 31, the recessed portions 11 being arranged in the peripheral area 31.

One end of the photo spacer 32 in the display area 30 is arranged on the first substrate 10, and the other end is arranged on the first metal layer 21. A second metal layer 22 is arranged on the second substrate 20 in the peripheral area 31. The second metal layer 22 is arranged on the first metal layer 21. One end of the photo spacer 32 in the peripheral area 31 is arranged on the recessed portion 11, and the other end of the photo spacer 32 in the peripheral area 31 is arranged on, the second metal layer 22. The depth of the recessed portion 11 is smaller than a doubled thickness of the second metal layer 22.

The photo spacer 32 in the peripheral area 31 is arranged at a position corresponding to the recessed portion 11, and the depth of the recessed portion 11 is smaller than a doubled thickness of the second metal layer 22. Therefore, uniformity of the thickness of a liquid crystal cell of the display panel is effectively improved, so as to effectively improve a phenomenon of uneven brightness of the display panel. Therefore, a display effect of the display panel is better, and a display quality of the display panel is improved. Moreover, the arrangement of the recessed portion 11 effectively limits the photo spacer 32, thereby effectively avoiding a displacement of the photo spacer 32, and ensuring better work of liquid crystals in the liquid crystal cell. Therefore, the color and the brightness of the display panel are ensured to be more even, and the display effect of the display panel is improved, thereby further improving competitiveness of the product.

In an embodiment, the depth of the recessed portion 11 is equal to the thickness of the second metal layer 22. The depth of the recessed portion is set to be equal to the thickness of the second metal layer 22, so that steps of butting positions at a first substrate 10 side and a second substrate 20 side are the same. For example, a=b shown in FIG. 1. To be specific, in the display area 30, the height of the photo spacer 32 on the first substrate 10 and the film thickness of the second substrate 20 at an opposite side are the first metal layer 21. However, in the peripheral area 31, the first substrate 10 is a value obtained by subscribing the depth of the recessed portion 11 from the height of the photo spacer 32, and the film thickness of the second substrate 20 at the opposite side is a value obtained by adding the thickness of the first metal layer 21 and that of the second metal layer 22. Therefore, steps from the first substrate 10 in the display area 30 and the peripheral area 31 to the second substrate 20 are completely equal. Thus, uniformity of the thickness of the liquid crystal cell of the display panel is consistent, thereby effectively ensuring the color and the brightness of the display panel to be more even, and improving the display effect of the display panel. In this way, competitiveness of the product is further improved.

In an embodiment, as shown in FIG. 1, the first substrate 10 includes a black matrix layer 13, and the recessed portion 11 is arranged on the black matrix layer 13. By adjusting a manufacture process of the black matrix layer 13, the black matrix layer 13 is manufactured through a multi-tone photomask process, and the recessed portion 11 is arranged on the black matrix layer 13. When a manufacture procedure of the black matrix layer 13 is performed, the multi-tone photomask process is performed at a position at which the photo spacer 32 needs to be arranged. In this way, the thickness that is of the black matrix layer 13 and that is at the position at which the photo spacer 32 is arranged is reduced relatively to the thickness when the multi-tone photomask process is not performed, thereby effectively forming the recessed portion 11. Therefore, the thickness that is of the black matrix layer 13 and that is at a proper position at which the photo spacer 32 needs to be arranged is controlled through the multi-tone photomask process, so that the thicknesses of the liquid crystal cell in the display area 30 and the peripheral area 31 are substantially consistent. Therefore, the color and the brightness of the display panel are more even, thereby effectively ensuring a better display effect of the display panel.

Figure 2:
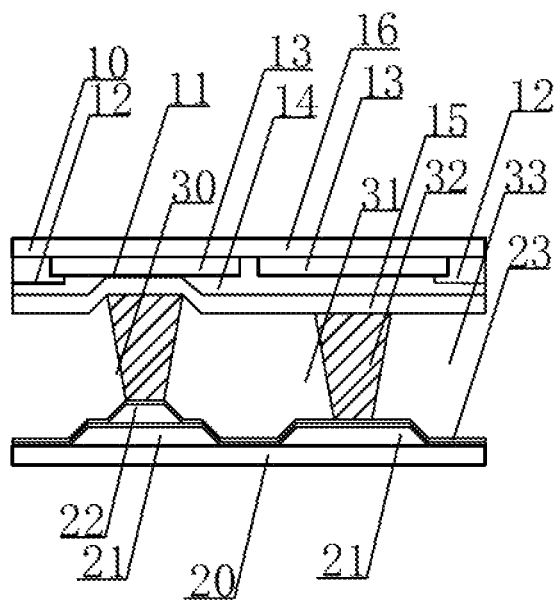
FIG. 2 is a schematic partial structural diagram of a display panel according to an embodiment of this application.

In an embodiment, as shown in FIG. 2, the first substrate 10 includes a transparent electrode layer 14, and the recessed portion 11 is arranged on the transparent electrode layer 14. By adjusting a manufacture process of the transparent electrode layer 14, the recessed portion 11 is arranged on the transparent electrode layer 14. When a manufacture procedure of the transparent electrode layer 14 is performed, the multi-tone photomask process is performed at a position at which the photo spacer 32 needs to be arranged. In this way, the thickness that is of the transparent electrode layer 14 and that is at the position at which the photo spacer 32 is arranged is reduced relatively to the thickness when the multi-tone photomask process is not performed, thereby effectively forming the recessed portion 11. Therefore, the thickness that is of the transparent electrode layer 14 and that is at a proper position at which the photo spacer 32 needs to be arranged is controlled through the multi-tone photomask process, so that the thicknesses of the liquid crystal cell in the display area 30 and the peripheral area 31 are substantially consistent. As a result, a phenomenon of uneven brightness of the display panel is effectively improved. Therefore, the display effect of the display panel is better, and the display quality of the display panel is improved.

Figure 3:
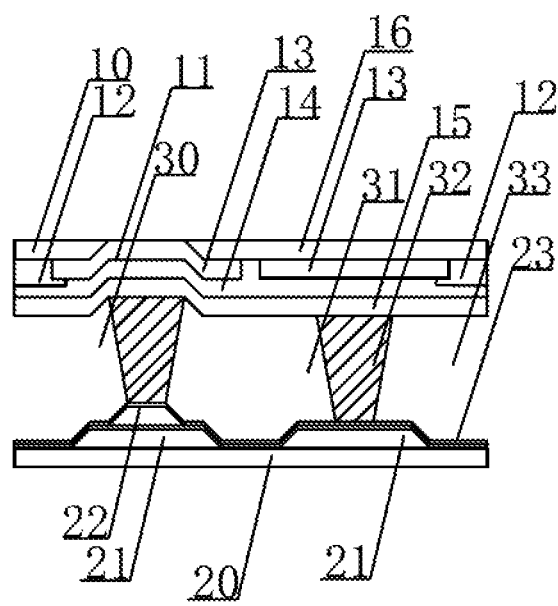
FIG. 3 is a schematic partial structural diagram of a display panel according to an embodiment of this application.

In an embodiment, as shown in FIG. 3, the first substrate 10 includes a first motherboard 16, and the recessed portion 11 is arranged on the first motherboard 16. The recessed portion 11 is formed on the first motherboard 16, and then a subsequent manufacture procedure is performed on the first motherboard merely through an exemplary process. The black matrix layer 13, the color photoresist layer 12, the transparent electrode layer 14, and the like that are arranged in the subsequent manufacture procedure are arranged at the recessed portions 11 of the first motherboard 16 based on the shapes of the recessed portions 11, without changing a process of the subsequent manufacture procedure, thereby effectively ensuring manufacturing efficiency of the display panel.

Figure 4:
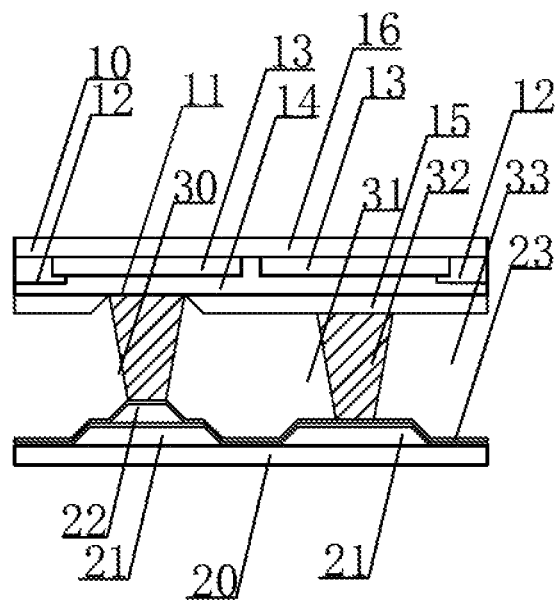
FIG. 4 is a schematic partial structural diagram of a display panel according to an embodiment of this application.

In an embodiment, as shown in FIG. 4, the first substrate 10 includes an alignment film layer 15, and the recessed portion 11 is arranged on the alignment film layer 15. The recessed portion 11 is formed on the alignment film layer 15, and then a subsequent manufacture procedure is performed on the first motherboard merely through an exemplary process, without changing a process of the subsequent manufacture procedure, thereby effectively ensuring the manufacturing efficiency of the display panel.

In an embodiment, the recessed poi ions 11 are rectangular grooves arranged at intervals and/or strip-shaped grooves arranged in parallel. The rectangular grooves may be arranged in the peripheral area 31 based on the length and width of an end that is of the photo spacer 32 and that is in contact with the first substrate 10, so as to effectively match the shape of each photo spacer 32, effectively limit the photo spacer 32, effectively avoid a displacement of the photo spacer 32, and ensure better work of liquid crystals in the liquid crystal cell. Therefore, the color and the brightness of the display panel are ensured to be more even, and the display effect of the display panel is improved. The rectangular grooves can be effectively manufactured by using a cross-type multi-tone photomask process. The strip-shaped grooves arranged in parallel make it much convenient and simple to manufacture the recessed portion 11, and effectively save consumables. The plurality of photo spacers 32 can be arranged in the same strip-shaped groove, so that it is more convenient to arrange the photo spacers 32. The strip-shaped grooves can be effectively manufactured by using a slit-type multi-tone photomask process.

In an embodiment, the second metal layer 22 includes a source layer 221 and a drain layer 222, a channel 223 is arranged between the source layer 221 and the drain layer 222, and the photo spacer 32 is arranged in a manner of crossing the channel 223. The photo spacer 32 can form effective support at two ends of the channel 223, so that the photo spacer 32 can be more stably arranged on the second metal layer 22, ensuring better work of the liquid crystals in the liquid crystal cell. Therefore, the color and the brightness of the display panel are ensured to be more even, and the display effect of the display panel is improved, thereby further improving the competitiveness of the product. Moreover, a cross section of the photo spacer 32 is quadrilateral, much effectively preventing the photo spacer 32 from rolling. As a result, the photo spacer 32 can be better fixed on the second metal layer 22, and a situation that spherical spacer materials are easily gathered is well relieved. In this way, defect pixels and damages to the color photoresist layer 12 are much effectively avoided, the color photoresist layer 12 is further effectively protected, and durability of the display panel is improved. Therefore, the display panel has a longer service life.

Figure 5:
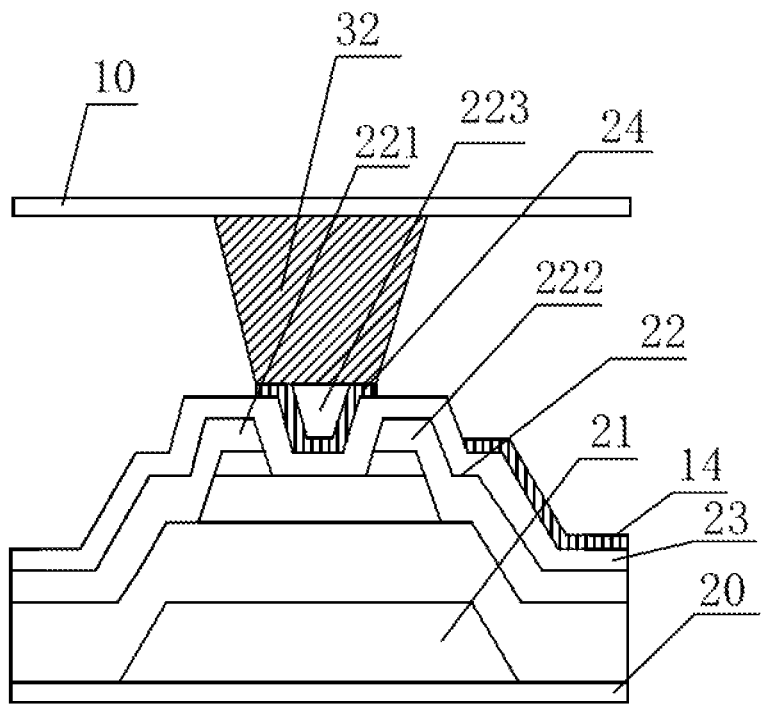
FIG. 5 is a schematic partial structural diagram of a peripheral area according to an embodiment of this application.

In an embodiment, as shown in FIG. 5, a protective layer 23 covers the second metal layer 22, and a support layer is arranged in an orthographic projection area that is of the photo spacer 32 and that is on the protective layer 23. The photo spacer 32 is better supported by arranging the support layer, thereby effectively relieving a deformation of the second metal layer 22 caused by an external force on the photo spacer 32 during the subsequent manufacture procedure, and well reducing impacts on an electrical property of the second metal layer 22. Therefore, a phenomenon that dark spots occur when a light is turned on is improved, so that the display effect of the display panel becomes better, and the display quality of the display panel is improved. Moreover, a light transmission rate and contrast of the photo spacer 32 are much high, thereby ensuring the color and the brightness of the display panel to be more even, and effectively improving the quality of the display panel. At the same time, good adhesion exists between the photo spacer 32 and the support layer, so that the photo spacer 32 is better fixed, thereby effectively avoiding a displacement of the photo spacer 32, and ensuring better work of the liquid crystals in the liquid crystal cell. Therefore, the color and the brightness of the display panel are ensured to be more even, and the display effect of the display panel is improved, thereby further improving the competitiveness of the product.

Figure 6:
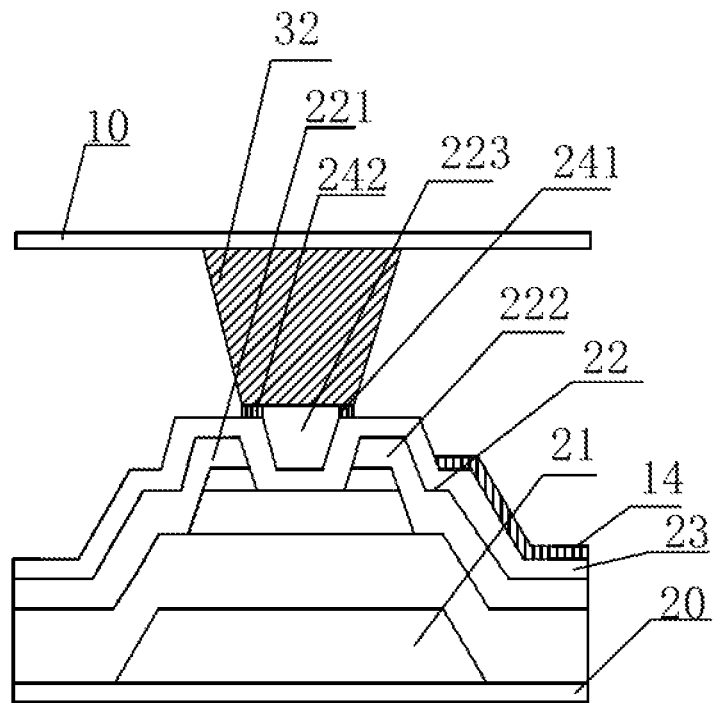
FIG. 6 is a schematic partial structural diagram of a peripheral area according to an embodiment of this application.

As shown in FIG. 6, in another embodiment, the support layer includes a first support layer 241 and a second support layer 242, the channel 223 is arranged between the first support layer 241 and the second support layer 242, the first support layer 241 is arranged on the protective layer 23 above the source layer 221, the second support layer 242 is arranged on the protective layer 23 above the drain layer 222, and the first support layer 241 and the second support layer 242 support the photo spacer 32. Better supporting the photo spacer 32 effectively relieves a deformation of the second metal layer 22 caused by an external force on the photo spacer 32 during the subsequent manufacture procedure, and well reduces impacts on the electrical property of the second metal layer 22. Therefore, a phenomenon that dark spots occur when a light is turned on is improved, so that the display effect of the display panel becomes better, and the display quality of the display panel is improved. Moreover, arranging the support layer at two ends of the channel 223 effectively reduces manufacturing difficulty, and the support layer is better arranged merely by exposing at a particular position designed for a photomask in a manufacture procedure of the transparent electrode layer 14. The photo spacer 32 can be better supported in a case of ensuring that the costs are kept unchanged, thereby ensuring the display quality of the display panel. No additional raw material is required, so that the costs and the storage costs of the raw material are reduced. No new material is required to be added to a bill of materials, facilitating procedure management and purchasing. No additional device is required to arrange the support layer, and the support layer can share the same device with the transparent electrode layer 14. During subsequent etching, no additional device and material are required.

The support layer and the transparent electrode layer 14 are manufactured by using the same material. Optionally, the support layer and the transparent electrode layer 14 use the same photomask. Only adaptive modifications are required to be performed on the photomask, facilitating manufacturing of the display panel, better simplifying production steps, and saving production costs. The support layer is better arranged merely by exposing, at a particular position designed for the photomask in the manufacture procedure of the transparent electrode layer 14. The photo spacer 32 can be better supported in a case of ensuring that the costs are kept unchanged, thereby ensuring the display quality of the display panel. No additional raw material is required, so that the costs and the storage costs of the raw material are reduced. No new material is required to be added to a bill of materials, facilitating procedure management and purchasing. No additional device is required to arrange the support layer, and the support layer can share the same device with the transparent electrode layer 14. During subsequent etching, no additional device and material are required. Better supporting the photo spacer 32 effectively relieves a deformation of the second metal layer 22 caused by an external force on the photo spacer 32 during the subsequent manufacture procedure, and well reduces impacts on the electrical property of the second metal layer 22. Therefore, a phenomenon that dark spots occur when a light is turned on is improved, so that the display effect of the display panel becomes better, and the display quality of the display panel is improved.

The protective layer 23 much effectively avoids direct corrosion of a cleaning agent to the source layer 221 and the drain layer 222 of the display panel, so that the source layer 221 and the drain layer 222 keep intact, Therefore, the problem of wire cut is alleviated, and the rework success rate of the first substrate 10 of the second metal layer 22 is further improved, so as to reduce the discard costs. Because the source layer 221 and the drain layer 222 are made of metal materials, seen from microstructures, side edges of both the source layer 221 and the drain layer 222 have metal burrs. The metal burrs on the source layer 221 and the drain layer 222 are better covered through arrangement of the protective layer 23. In this way, the metal burrs are effectively prevented from being exposed outside the protective layer 23, so that the protective layer 23 better protects the source layer 221 and the drain layer 222. Impacts of a subsequent manufacture procedure on the source layer 221 and the drain layer 222 are effectively avoided, so as to better improve the yield rate of the display panel. Optionally, the protective layer 23 is arranged to have two layers that respectively are a first protective layer 23 and a second protective layer 23. The first protective layer 23 covers the first substrate 10, and the second protective layer 23 covers the first protective layer 23, thereby better covering the metal burrs on metal layers. The first protective layer 23 much effectively covers the metal burrs, and the second protective layer 23 much effectively covers the metal burrs exposed on the first protective layer 23, thereby much effectively preventing the metal burrs from being exposed outside the protective layer 23. Therefore, the protective layer 23 better protects the metal layers, and much effectively avoids direct corrosion of the cleaning agent to the metal layers of the display panel. Therefore, the metal layers keep intact, so that the problem of wire cut is avoided, the durability of the display panel is unproved, and a discard rate of the first substrate 10 is effectively reduced, being more environmentally friendly.

In an embodiment, the material of the substrate may be glass, a plastic transparent material, or the like.

In an embodiment, using a liquid crystal panel as an example, the liquid crystal panel includes an array substrate and a color film (CF) substrate that are arranged opposite to each other. Liquid crystals and photo spacers 32 are arranged between the array substrate and the CF substrate. An active switch that is, for example, a thin film transistor (TFT) is arranged on the array substrate. The color photoresist layer 12 is arranged on the color substrate. The color photoresist layer 12 and the active switch may be formed on the same substrate.

In an embodiment, the display panel includes a liquid crystal panel, an organic light-emitting diode (OLED) panel, a quantum dot light emitting diode (QLED) panel, a plasma panel, a planar panel, a curved panel, or the like. This is not limited herein.

Figure 7:
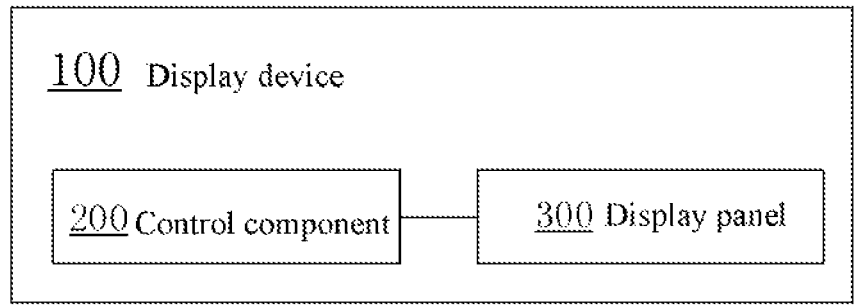
FIG. 7 is a schematic diagram of a display device according to an embodiment of this application.

Referring to FIG. 7, this implementation discloses a display device 100. The display device 100 includes a control component 200 and the display panel 300 described in this application. Detailed descriptions are made above by using the display panel as an example. It should be noted that the foregoing descriptions about the structure of the display panel are also suitable for the display device in the embodiments of this application. When the display device in this embodiment of this application is a liquid crystal display, the liquid crystal display includes a backlight module that can serve as a light source for providing sufficient brightness and evenly distributed light. The backlight module in this embodiment may be a frontlit type backlight module or may be a backlit type backlight module. It should be noted that the backlight module in this embodiment is not limited thereto.

The foregoing contents are detailed descriptions of this application in conjunction with specific optional embodiments, and it should not be considered that the specific implementation of this application is limited to these descriptions. Persons of ordinary skill in the art can further make simple deductions or replacements without departing from the concept of this application, and such deductions or replacements should all be considered as falling within the protection scope of this application.

What is claimed is:

1. A display panel, comprising:
a first substrate, comprising a plurality of grooves;
a second substrate, comprising a first metal layer;
a color photoresist layer, disposed on the first substrate or the second substrate;
a liquid crystal layer, disposed between the first substrate and the second substrate;
a plurality of photo spacers, arranged between the first substrate and the second substrate;
a display area, the color photoresist layer and the liquid crystal layer being arranged in the display area; and
a peripheral area, the plurality of grooves being disposed in the peripheral area, wherein the plurality of photo spacers are disposed in the display area and the peripheral area;
wherein one end of each photo spacer disposed in the display area is arranged on the first substrate, and another end is arranged on the first metal layer of the second substrate;
wherein a second metal layer is arranged on the second substrate in the peripheral area, and is arranged on the first metal layer; wherein one end of each photo spacer disposed in the peripheral area is arranged in a respective groove, and another end is arranged on the second metal layer; and wherein a depth of the groove is smaller than a doubled thickness of the second metal layer;

wherein a portion of the first substrate corresponding to a position of each photo spacer disposed in the display area is not provided with a groove, and wherein a depth of each groove defined in the peripheral area at least partially cancels out a height of a respective opposite second metal layer, and wherein a thickness of a portion of the display panel at a position of each photo spacer in the peripheral area is equal to a thickness of the portion of the display panel at the position of each photo spacer in the display area.

2. The display panel according to claim 1, wherein the depth of each groove is equal to the thickness of the second metal layer, wherein the first metal layer has a uniform thickness throughout the peripheral area and the display area, and wherein in the peripheral area a depth of each groove defined in the first substrate cancels out a height of the respective opposite second metal layer disposed on the second substrate, so that the display panel has a uniform thickness throughout the peripheral area and the display area.

3. The display panel according to claim 1, wherein the first substrate comprises a black matrix layer, and each groove is defined in the black matrix layer.

4. The display panel according to claim 1, wherein the first substrate comprises a transparent electrode layer, and each groove is defined in the transparent electrode layer.

5. The display panel according to claim 1, wherein the first substrate comprises a first motherboard, and each groove is defined in the first motherboard.

6. The display panel according to claim 1, wherein the first substrate comprises an alignment film layer, and each groove is defined in the alignment film layer.

7. The display panel according to claim 1, wherein the plurality of grooves comprise rectangular grooves arranged at intervals and/or strip-shaped grooves arranged in parallel.

8. The display panel according to claim 1, wherein the second metal layer comprises a source layer and a drain layer, a channel is defined between the source layer and the drain layer, and each photo spacer disposed in the peripheral area of the display panel sits across the respective channel.

9. The display panel according to claim 1, wherein the plurality of photo spacers are each a truncated pyramid with a rectangular base, wherein a base surface of each photo spacer disposed in the peripheral area is arranged on a bottom surface of the respective groove, and a top surface of the photo spacer is arranged on the respective second metal layer of the second substrate; wherein a base surface of each photo spacer disposed in the display area is arranged on the first substrate, and a top surface of the photo spacer is arranged on the respective first metal layer of the second substrate.

10. The display panel according to claim 1, wherein the first substrate comprises a first motherboard, a black matrix layer disposed on the first mother board, a transparent electrode layer disposed on the black matrix layer, and an alignment film layer disposed on the transparent electrode layer, wherein both sides of the first motherboard are flat at the portion corresponding to the position of each photo spacer disposed in the peripheral area, wherein each groove defined in the peripheral area is defined in the black matrix layer, and the transparent electrode layer is laid on and curves along with the black matrix layer to form a groove aligned and congruent with the groove defined in the black matrix layer, and the alignment film layer is laid on and curves along with the transparent electrode layer to form a groove aligned and congruent with the groove defined by the transparent electrode layer, wherein the one end of each photo spacer disposed in the peripheral area is arranged in the respective groove defined by the alignment film layer, with the one end of the photo spacer abutting against a bottom wall of the respective groove of the alignment film layer, and the other end being arranged on and abutting against the respective second metal layer disposed on the second substrate;

wherein each of the first motherboard, the black matrix layer, the transparent electrode layer, and the alignment film layer has both sides that are flat at the position corresponding to each photo spacer disposed in the display area.

11. The display panel according to claim 1, wherein the first substrate comprises a first motherboard, a black matrix layer disposed on the first mother board, a transparent electrode layer disposed on the black matrix layer, and an alignment film layer disposed on the transparent electrode layer, wherein each groove defined in the peripheral area is defined in the first motherboard, and wherein the black matrix layer is laid on and curves along with the first motherboard thus forming a groove aligned and congruent with the groove defined in the first motherboard, and the transparent electrode layer is laid on and curves along with the black matrix layer to form a groove aligned and congruent with the groove defined by the black matrix layer, and the alignment film layer is laid on and curves along with the transparent electrode layer to form a groove aligned and congruent with the groove defined by the transparent electrode layer, wherein the one end of each photo spacer disposed in the peripheral area is arranged in the respective groove defined by the alignment film layer, with the one end of the photo spacer abutting against a bottom wall of the respective groove of the alignment film layer, and the other end being arranged on and abutting against the respective second metal layer disposed on the second substrate;

wherein each of the first motherboard, the black matrix layer, the transparent electrode layer, and the alignment film layer has both sides that are flat at the position corresponding to each photo spacer disposed in the display area.

12. The display panel according to claim 1, wherein the first substrate comprises a first motherboard, a black matrix layer disposed on the first mother board, a transparent electrode layer disposed on the black matrix layer, and an alignment film layer disposed on the transparent electrode layer, wherein both sides of each of the first motherboard and the black matrix layer are flat at the portion corresponding to the position of each photo spacer disposed in the peripheral area, wherein each groove defined in the peripheral area is defined in the transparent electrode layer, and the alignment film layer is laid on and curves along with the transparent electrode layer to form a groove aligned and congruent with the groove defined in the transparent electrode layer, wherein the one end of each photo spacer disposed in the peripheral area is arranged in the respective groove defined by the alignment film layer, with the one end of the photo spacer abutting against a bottom wall of the respective groove of the alignment film layer, and the other end of the photo spacer being arranged on and abutting against the respective second metal layer disposed on the second substrate;

wherein each of the first motherboard, the black matrix layer, the transparent electrode layer, and the alignment film layer has both sides that are flat at the position corresponding to each photo spacer disposed in the display area.

13. The display panel according to claim 1, wherein the first substrate comprises a first motherboard, a black matrix layer disposed on the first mother board, a transparent electrode layer disposed on the black matrix layer, and an alignment film layer disposed on the transparent electrode layer, wherein both sides of each of the first motherboard, the black matrix layer, and the transparent electrode layer are flat at the portion corresponding to the position of each photo spacer disposed in the peripheral area, wherein each groove defined in the peripheral area is defined in the alignment film layer, wherein the one end of each photo spacer disposed in the peripheral area is arranged in the respective groove defined in the alignment film layer, with the one end of the photo spacer abutting against a bottom wall of the respective groove of the alignment film layer, and the other end of the photo spacer being arranged on and abutting against the respective second metal layer disposed on the second substrate;

wherein each of the first motherboard, the black matrix layer, the transparent electrode layer, and the alignment film layer has both sides that are flat at the position corresponding to each photo spacer disposed in the display area.

14. The display panel according to claim 1, wherein each second metal layer is covered by a protective layer, and a support layer is arranged on the protective layer in an orthographic projection area of the photo spacer onto the protective layer, wherein the support layer comprises a first support layer disposed on the portion of the protective layer overhead the source layer, and a second support layer disposed on the portion of the protective layer overhead the drain layer, wherein the first support layer and the second support layer are two separate and discrete support layers, and wherein the channel is located between the first support layer and the second support layer.

15. The display panel according to claim 14, wherein the support layer is made of the same material as a transparent electrode layer disposed on the protective layer and is manufactured using the same photomask as the transparent electrode layer in the same manufacturing procedure.

16. The display panel according to claim 1, wherein each second metal layer is covered by a protective layer, and a support layer is arranged on the protective layer in an orthographic projection area of the photo spacer onto the protective layer, wherein the protective layer is laid on and curves along with the channel, which is U-shaped and has a flat bottom and two sloping sides, thus forming a groove aligned and congruent with the channel, and the support layer is laid on and curves along with the protective layer thus forming a groove aligned and congruent with the groove defined by the protective layer, and wherein the support layer comprises a U-shaped portion and two flat horizontal portions, the U-shaped portion comprising a flat bottom and two sloping sides, and the two flat horizontal portions are respectively connected to two upper ends of the two sloping sides of the U-shaped portion, and two sides of the top surface of the respective photo spacer are respectively disposed on and abut against the two flat horizontal portions of the support layer.

17. A display panel, comprising:
a first substrate, comprising a plurality of grooves;
a second substrate, comprising a first metal layer;
a color photoresist layer, disposed on the first substrate or the second substrate;
a liquid crystal layer, disposed between the first substrate and the second substrate;
a plurality of photo spacers, arranged between the first substrate and the second substrate;
a display area, the color photoresist layer and the liquid crystal layer being arranged in the display area; and
a peripheral area, the plurality of grooves being disposed in the peripheral area, wherein the plurality of photo spacers are disposed in the display area and the peripheral area;
wherein one end of each photo spacer disposed in the display area is arranged on the first substrate, and another end is arranged on the first metal layer of the second substrate;
wherein a second metal layer is arranged on the second substrate in the peripheral area, and is arranged on the first metal layer; wherein one end of each photo spacer disposed in the peripheral area is arranged in a respective groove, and another end is arranged on the second metal layer; and wherein a depth of the groove is smaller than a doubled thickness of the second metal layer;
wherein the first substrate comprises a black matrix layer, and each groove is defined in the black matrix layer;
the second metal layer comprises a source layer and a drain layer, a channel is defined between the source layer and the drain layer, and each photo spacer disposed in the peripheral area of the display panel sits across the respective channel; and
a protective layer covers the second metal layer, and a support layer is arranged on the protective layer in an orthographic projection area of the photo spacer onto the protective layer;
wherein a portion of the first substrate corresponding to a position of each photo spacer disposed in the display area is not provided with a groove, and wherein a depth of each groove defined in the peripheral area at least partially cancels out a height of a respective opposite second metal layer, and wherein a thickness of a portion of the display panel at a position of each photo spacer in the peripheral area is equal to a thickness of the portion of the display panel at the position of each photo spacer in the display area.

18. A display device, comprising a control component and a display panel, the display panel comprising:
a first substrate, comprising a plurality of grooves;
a second substrate, comprising a first metal layer;
a color photoresist layer, disposed on the first substrate or the second substrate;
a liquid crystal layer, disposed between the first substrate and the second substrate;
a plurality of photo spacers, arranged between the first substrate and the second substrate;
a display area, the color photoresist layer and the liquid crystal layer being arranged in the display area; and
a peripheral area, the plurality of grooves being disposed in the peripheral area, wherein the plurality of photo spacers are disposed in the display area and the peripheral area;
wherein one end of each photo spacer disposed in the display area is arranged on the first substrate, and another end is arranged on the first metal layer of the second substrate;
wherein a second metal layer is arranged on the second substrate in the peripheral area, and is arranged on the first metal layer; wherein one end of each photo spacer disposed in the peripheral area is arranged in a respective groove, and another end is arranged on the second metal layer; and wherein a depth of the groove is smaller than a doubled thickness of the second metal layer;

wherein a portion of the first substrate corresponding to a position of each photo spacer disposed in the display area is not provided with a groove, and wherein a depth of each groove defined in the peripheral area at least partially cancels out a height of a respective opposite second metal layer, and wherein a thickness of a portion of the display panel at a position of each photo spacer in the peripheral area is equal to a thickness of the portion of the display panel at the position of each photo spacer in the display area.

19. The display device according to claim 18, wherein the depth of each groove is equal to the thickness of the second metal layer, wherein the first metal layer has a uniform thickness throughout the peripheral area and the display area, and wherein in the peripheral area a depth of each groove defined in the first substrate cancels out a height of the respective opposite second metal layer disposed on the second substrate, so that the display panel has a uniform thickness throughout the peripheral area and the display area.

20. The display device according to claim 18, wherein the first substrate comprises a black matrix layer, and each groove disposed in the peripheral area is defined in the black matrix layer.

* * * * *